No. 874,979. PATENTED DEC. 31, 1907.
W. J. MURPHY.
TROLLEY HARP.
APPLICATION FILED JULY 20, 1904. RENEWED OCT. 31, 1907.

WITNESSES.
H. A. Lamb
S. W. Atherton

INVENTOR.
William J. Murphy
By A. M. Wooster
Atty.

ial No. 400,069.

UNITED STATES PATENT OFFICE.

WILLIAM J. MURPHY, OF BRIDGEPORT, CONNECTICUT, ASSIGNOR TO FRANK B. KENNEDY, OF NEW HAVEN, CONNECTICUT.

TROLLEY-HARP.

No. 874,979.  Specification of Letters Patent.  Patented Dec. 31, 1907.

Application filed July 20, 1904. Serial No. 217,346. Renewed October 31, 1907. Serial No. 400,069.

*To all whom it may concern:*

Be it known that I, WILLIAM J. MURPHY, a citizen of the United States, residing at Bridgeport, county of Fairfield, State of Connecticut, have invented a new and useful Trolley-Harp, of which the following is a specification.

My invention has for its object to provide trolley harps, so called, that is the yokes by which trolley wheels are carried, which shall be simple and inexpensive to make, durable, not liable to get out of repair, will provide a perfect contact, will prevent jumping of the trolley wheels and the flashing caused by breaking of the current between the wheel or bushing and the axle in the ordinary construction of trolley harps, will have no pins, axles or independent parts to drop and which shall be so constructed as to permit a wheel to be readily removed and another wheel, for example a sleet wheel, to be substituted in its place.

In trolley harps as ordinarily constructed, the wheel turns upon a pin which is driven through the sides or arms of the harp and serves as a bearing for the wheel. The wear is principally upon the wheels which are quite expensive and frequently wear but a very short time. In practice, worn wheels are sometimes bushed and made to serve a little longer but they quickly wear loose again and there is a constant jumping of the wheels and flashing caused by the breaking of the current between the wheel or the bushing and the axle.

My present invention enables me to practically overcome this difficulty and to provide a harp that may be attached to any kind of pole and will last for an almost unlimited length of time and a trolley wheel that will outlast quite a number of ordinary trolley wheels and which may be removed and a new one substituted in its place in a moment's time. This convenient substitution of one trolley wheel for another proves an important feature of construction when a trolley wheel becomes worn on a long run and especially if it is found necessary or desirable to substitute a sleet wheel for a smooth wheel when at a distance from the car station, as it is frequently quite a difficult matter in cold and icy weather to drive out the axle pin of ordinary trolley wheels and there being considerable danger of dropping the axle pin to the ground and of losing it if the change has to be made in the dark.

Figure 1:
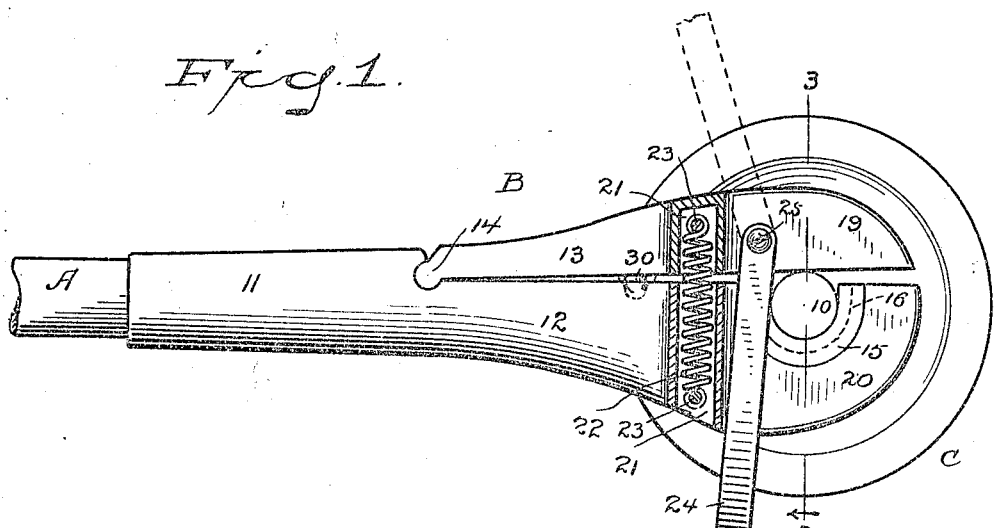
Figure 2:
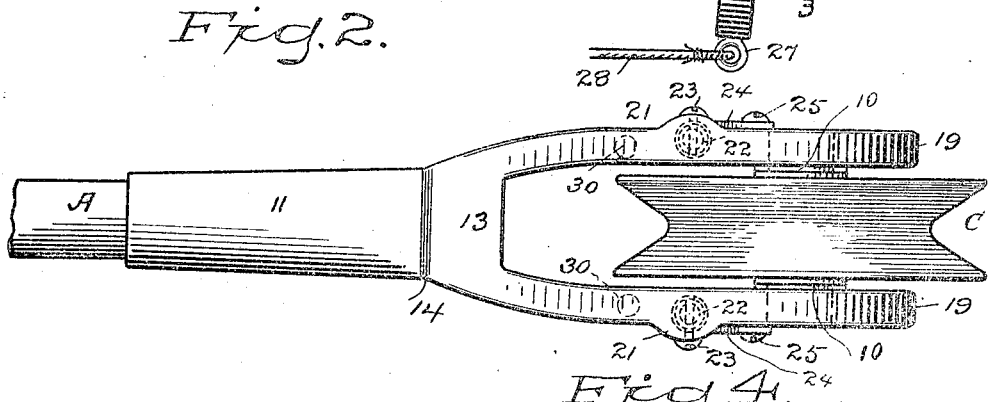
Figures 3, 4:
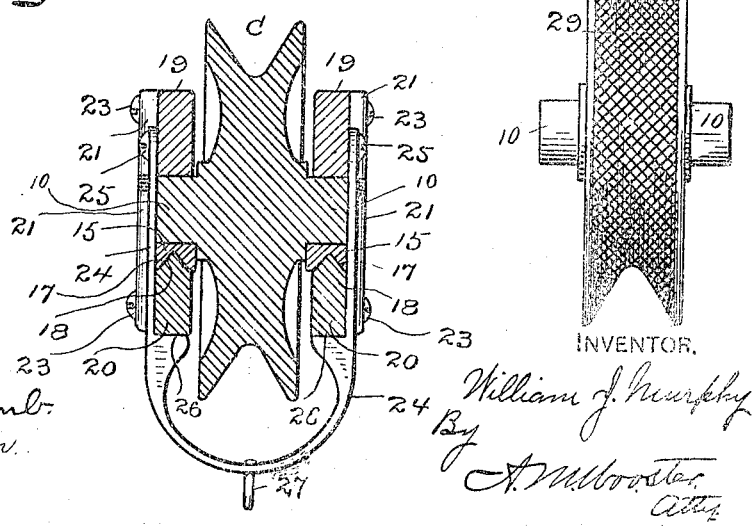

In the accompanying drawing forming part of this specification, Figure 1 is a side elevation of my novel trolley harp, one of the spring pockets being in section and the raised position of the bail being indicated by dotted lines; Fig. 2 a plan view; Fig. 3 a section on the line 3—3 in Fig. 1 looking toward the left; and Fig. 4 is a view of a sleet wheel detached.

A denotes a trolley pole, B my novel harp as a whole and C a trolley wheel which is cast or otherwise made with integral unitary trunnions 10. The harp consists essentially of a shank 11, a fixed arm 12 and an upper movable arm 13 which is hinged to the fixed arm as at 14. The trunnions of the trolley wheel rest in bearings 15 which may be made of Babbitt or other suitable metal and which lie in recesses 16 in fixed arm 12. These bearings are shown as provided in their underside with grooves 17 which receive corresponding ribs 18 in the recesses and retain the bearings against lateral displacement. Both of the arms are bifurcated, the branches of upper arm 13 being indicated by 19 and the branches of the lower fixed arm, which carry the bearings, being indicated by 20. The trolley wheel lies between these branches as clearly shown in Figs. 2 and 3.

In practice, the branches of the upper arm rest upon the trunnions as indicated in Fig. 1, the branches being shaped so as to provide for variation in the size of the trunnions and for wear of the trunnions, which however in practice when the trolley wheel trunnions are cast in brass and the bearings are made of Babbitt metal is very slight. The branches of the upper arm are shown as provided on the underside with projecting lugs 30 which are adapted to engage corresponding recesses in the upper face of the branches of the fixed arm to retain the arms against lateral displacement.

21 denotes spring pockets formed in the corresponding upper and lower branches of the arms, the upper end of each pocket being closed as clearly shown in Fig. 1 so as to exclude ice and snow.

22 denotes springs in these pockets, the opposite ends of which are connected to screw bolts 23 at the opposite ends of the pockets. That is to say, the upper end of each spring is secured to a screw bolt in the upper end of the portion of the pocket in one of the branches of the upper arm and the lower end of said spring is secured to another screw bolt near the lower end of the portion of said pocket that is located in the corresponding branch of the lower or fixed arm. These springs yield sufficiently to permit the upper arm to be raised for the purpose of inserting or removing a trolley wheel and normally draw the branches of the upper arm down upon the trunnions which are thus retained in the bearings, as clearly shown in Fig. 1. In order however to provide a lock that will prevent the trolley wheel from being thrown from its bearings should the wheel leave the wire violently, I provide a bail 24 which is pivoted to the branches of the upper movable arm as at 25. This bail swings around under the lower fixed arm and is provided with shoulders 26 which engage the underside of the lower fixed arm and thus render it impossible for the arms to become separated and the trolley wheel to be thrown from its bearings. This bail, in addition to locking the movable arm in place, performs several other important functions in that it serves as a convenient lift by which to raise the upper arm when swung upward, as in dotted lines in Fig. 1, in order to remove or insert a trolley wheel, is provided with a ring or eye 27 to which the trolley cord 28 is attached and by inclosing the trolley wheel on the underside it forms a guard and renders it impossible for the trolley wheel to engage the wire from above when the pole is pulled down after the wheel has been thrown off.

29 denotes a sleet wheel, that is a trolley wheel having its groove provided with a roughened surface in order to crack sleet and ice off from a trolley wire. Sleet wheels are found practically indispensable in icy weather but are not used at other times for the reason that under ordinary conditions wheels having a smooth groove provide the best contact.

The operation will be so obvious from the description already given as hardly to require further explanation. In order to remove a trolley wheel and insert a new one as in changing from a smooth wheel to a sleet wheel or vice versa, the operator simply swings the bail upward over the upper arm as indicated by dotted lines in Fig. 1 and raises the upper arm against the power of the spring sufficiently to permit the trolley wheel already in the bearings to be removed and another substituted in its place. As soon as the upper arm is released the springs will draw it down upon the trunnions, as in Fig. 1, and by swinging the bail downward to the full line position in Fig. 1 the arms are locked together so that the wheel cannot possibly be thrown from its bearings. The trolley cord is attached to the bail which incloses the trolley wheel from side to side and serves as a guard therefor so that in pulling the pole down after the wheel has been thrown off from the wire, the wheel cannot engage the wire from above but the wire will be engaged by the bail which will slip downward past the wire and enable the operator to place the trolley wheel in engagement with the underside of the wire.

Having thus described my invention I claim:

1. A trolley harp comprising a shank, a fixed arm provided with bearings, a trolley wheel provided with unitary trunnions which engage the bearings and a hinged upper arm the free end of which rests over the trunnions.

2. A trolley harp comprising a fixed bifurcated arm provided with bearings, a bifurcated upper arm hinged to the fixed arm, a trolley wheel lying between the branches of the arms and having unitary trunnions engaging the bearings, and springs connecting the corresponding branches of the arms and acting to retain the branches of the upper arm in engagement with the trunnions.

3. A trolley harp comprising a fixed bifurcated arm provided with bearings, a bifurcated upper arm hinged to the fixed arm, spring pockets in the corresponding branches of the arms, springs in said pockets whose opposite ends are connected to the respective arms, and a trolley wheel having unitary trunnions which engage the bearings.

4. A trolley harp comprising a fixed arm provided with bearings, an upper arm hinged thereto, a trolley wheel having unitary trunnions engaging the bearings and a bail pivoted to the upper arm and adapted to swing under the lower arm and serve as a lock to prevent the trolley wheel from being thrown from its bearings and as a guard to prevent the wheel from engaging the wire from above.

5. A trolley harp comprising a fixed bifurcated arm having recesses provided with ribs, bearings having grooves in their underside engaging the ribs, a bifurcated upper arm hinged to the fixed arm and a trolley wheel lying between the branches of the arms and having unitary trunnions engaging the bearings.

6. A trolley harp comprising a fixed arm provided with bearings, an upper arm hinged thereto, a trolley wheel having unitary trunnions engaging the bearings and a bail pivoted to the upper arm and provided with shoulders adapted to engage the fixed arm, as and for the purpose set forth.

7. In a trolley harp, the combination of a shank provided with a pair of bifurcated lower arms, a pair of bifurcated upper arms hinged to the said shank, means for removably supporting a trolley wheel between the two pairs of arms, and a spring device for holding the said pairs of arms toward each other.

8. A trolley harp, comprising a shank provided with a pair of bifurcated lower arms, a pair of bifurcated upper arms hinged to the said shank to close over the said lower arms, means for removably supporting a trolley wheel between the said pairs of arms, a spring device for holding the said pairs of arms together to yieldingly retain the said wheel in position, and a positive locking device comprising a bail hinged to one pair of arms and arranged to swing around the ends of the other pair of arms to positively lock the said pairs of arms together.

9. A trolley harp, having in combination a shank provided with a pair of bifurcated lower arms, a pair of bifurcated upper arms hinged to the said shank and overlying the said lower arms, seats between the said pairs of arms for removably supporting a trolley wheel, a spring device for yieldingly holding the said pairs of arms together to prevent unintentional displacement of the wheel therefrom, and a positive locking device comprising a locking bail hinged to one pair of the said arms to swing around the other pair of arms to hold the two pairs of arms positively together, and means for attaching the trolley cord to the bail to hold the latter toward its locked position by the pull of the cord when in running position.

In testimony whereof I affix my signature, in presence of two witnesses.

WILLIAM J. MURPHY.

Witnesses:
A. M. WOOSTER,
S. W. ATHERTON.